United States Patent [19]

Mageau

[11] Patent Number: 5,163,142
[45] Date of Patent: Nov. 10, 1992

[54] EFFICIENT CACHE WRITE TECHNIQUE THROUGH DEFERRED TAG MODIFICATION

[75] Inventor: Paul Mageau, Townsend, Mass.

[73] Assignee: Hewlett-Packard Company, Palo Alto, Calif.

[21] Appl. No.: 544,049

[22] Filed: Jun. 22, 1990

Related U.S. Application Data

[63] Continuation of Ser. No. 264,058, Oct. 28, 1988, abandoned.

[51] Int. Cl.⁵ .................. G06F 12/08; G06F 11/00
[52] U.S. Cl. .................. 395/425; 364/243.4; 364/243.41; 364/244.3; 364/DIG. 1; 364/265; 364/265.3; 364/964.2; 364/964.34
[58] Field of Search .............. 364/200, 900 MS File; 395/800, 425

[56] References Cited

U.S. PATENT DOCUMENTS

| | | | |
|---|---|---|---|
| 3,978,452 | 8/1976 | Barton | 364/200 |
| 4,128,882 | 12/1978 | Dennis | 364/200 |
| 4,142,234 | 2/1979 | Bean et al. | 364/200 |
| 4,195,340 | 3/1980 | Joyce | 364/200 |
| 4,197,589 | 4/1980 | Cornish | 364/900 |
| 4,349,871 | 9/1982 | Lary | 364/200 |
| 4,392,200 | 7/1983 | Arulpragasam et al. | 364/200 |
| 4,439,829 | 3/1984 | Tsiang | 364/200 |
| 4,483,003 | 11/1984 | Beal | 371/51 |
| 4,587,610 | 5/1986 | Rodman | 364/200 |
| 4,620,275 | 10/1986 | Wallach et al. | 364/200 |
| 4,675,806 | 6/1987 | Uchida | 364/200 |
| 4,695,943 | 9/1987 | Keeley et al. | 364/200 |
| 4,701,844 | 10/1987 | Thompson et al. | 364/200 |
| 4,736,293 | 4/1988 | Patrick | 364/200 |
| 4,768,148 | 8/1988 | Keeley et al. | 364/200 |
| 4,797,043 | 5/1988 | Rodman | 364/200 |
| 4,841,436 | 6/1989 | Asano | 364/200 |
| 4,858,111 | 8/1990 | Steps | 364/200 |
| 4,872,111 | 10/1990 | Daberkow et al. | 364/200 |
| 4,965,716 | 10/1990 | Sweeney | 364/200 |
| 5,047,920 | 9/1991 | Funabashi | 364/200 |

FOREIGN PATENT DOCUMENTS 63-206843  8/1988  Japan.

Primary Examiner—Thomas C. Lee
Assistant Examiner—Caleb Pollack
Attorney, Agent, or Firm—Richard F. Schuette

[57] ABSTRACT

An efficient cache write technique useful in digital computer systems wherein it is desired to achieve single cycle cache write access even when the processor cycle time does not allow sufficient time for the cache control to check the cache "tag" for validity and to reflect those results to the processor within the same processor cycle. The novel method and apparatus comprising a two-stage cache access pipeline which embellishes a simple "write-thru with write-allocate" cache write policy.

7 Claims, 3 Drawing Sheets

EFFICIENT CACHE WRITE TECHNIQUE THROUGH DEFERRED TAG MODIFICATION

This application is a continuation of application Ser. No. 07/264,058, filed Oct. 28, 1988 now abandoned.

FIELD OF THE INVENTION

This invention relates to digital computer systems which incorporate data caching methods and apparatus.

BACKGROUND OF THE INVENTION

Under ideal conditions, increased processor speed translates into an increased demand on memory per unit time. Processing elements often are capable of operating at rates that exceed those of dynamic random access memories (DRAM) which are most often used for primary storage. When system performance is paramount, an additional level of memory hierarchy, called a "cache", whose performance is matched to that of the associated processor is incorporated.

Caches are small (when compared to the size of the primary storage), fast localized memory arrays which supply data at rates which do not impede the associated processor's performance. The viability of caches are based on the probabilities that programs tend to reference a particular piece of data many times before moving onto another (temporal locality), and that successive references made tend to be relatively close to the previous reference made (spatial locality). Cache designers capitalize on this by using the knowledge of the recent past (i.e., previous data reference patterns) to predict the near future in that they collect data relating to references made recently for subsequent use.

In processing systems which employ data caches, every cache reference made must be validated. Every cache entry must have associated with it a "tag" which describes which data in main memory is currently being represented by it and a "valid" bit which indicates the validity of the cache entry itself. A "cache hit" occurs when the desired data resides in the cache while a "cache miss" occurs when it is not. The actual transfer of data between the processor and the cache is often conditioned by the results of the cache tag lookup. This tends to increase effective cache access times which often leads to a proportional increased processor cycle times or system performance degradation.

Minimizing cache store latency is particularly challenging in that the processor must often stall until the cache access is validated since it is the source of the data. Additionally, all cache data modifications must be reflected in the state of the cache tag to maintain cache consistency.

A common cache store policy is to condition the cache update on the results of the cache tag lookup. When a cache hit occurs, the cache modification may then proceed. If a cache miss occurs, one of two actions may take place, cache write bypass or cache write allocation. Cache write bypass is not a general solution since this is not usable for virtual cache designs, but it does not achieve single cycle cache access since no cache modification takes place. Simple cache write allocation would take two cache cycles: cache tag read and cache data/tag write. The serialization of the cache tag lookup to cache data modify increases the effective cache store access time by a factor of two, one cache tag read and one cache data nd optionally tag write cycle. Since the processor is the source of the data, it must often stall until the cache tag check is completed.

Another approach which avoids this serialization penalty completely ignores the state of the cache tag. With this approach, every cache store operation bypasses the cache. To maintain cache consistency, the modified cache entry is invalidated without regard. The processor need only supply data for one cache (data) write cycle. This approach reduces the effective store cache access time, but not without significant losses in cache performance since these invalidations may purge useful data from the cache.

SUMMARY OF THE INVENTION

The referred cache tag modification according to the present invention provides a simple, efficient, low-overhead cache write technique having a two-stage, overlapped, cache split-cycle access pipeline, which updates the data store in the first or ACC stage and defers any tag store modification until the state of the cache tag check was known. Since the processor is capable of issuing byte writes, a "valid" bit per byte of cache width is employed. If a write-hit is detected, no tag modification is necessary and the processor again has the "illusion" of a single cycle cache access. If the tag matches but the proper valid bits are not set, the cache management function "schedules" a cache tag update for the cycle following the second or EXC stage of the write that missed.

The cache management function (CMF) is capable of merging the previous tag valid bit state of the cache with the valid bits that will be set as a result of this write operation. Additionally, if there is a write operation in the immediately following cache operation that is addressed to the same cache line, the bytes selected by this store are merged with the tag update state, thereby avoiding a potential back-to-back write miss. If the tag mismatches, the previous tag/valid bit state is discarded and the tag update state is changed and becomes the bytes being selected by the store in its EXC stage concatenated with the appropriate address tag information. If there is a write operation immediately following that is addressed to the same cache line, the bytes selected by this store, in its ACC stage, are merged with the tag update state. In either case, this cache write update policy is called "write-allocate", meaning space is allocated in the cache on a write-miss. Moreover, during a write-miss sequence, the processor need not be stalled since the data had been captured in the cache. Since the cache management function must regain control to service the cache miss, the processor need only stall if it needs to access the cache while the CMF is using it.

BRIEF DESCRIPTION OF THE DRAWINGS

These said further features of the present invention are better understood by reading the following detailed description taken together with the drawing, wherein.

Further details of one embodiment of the present invention are provided in Appendix I.

DETAILED DESCRIPTION OF THE INVENTION

Figure 1:
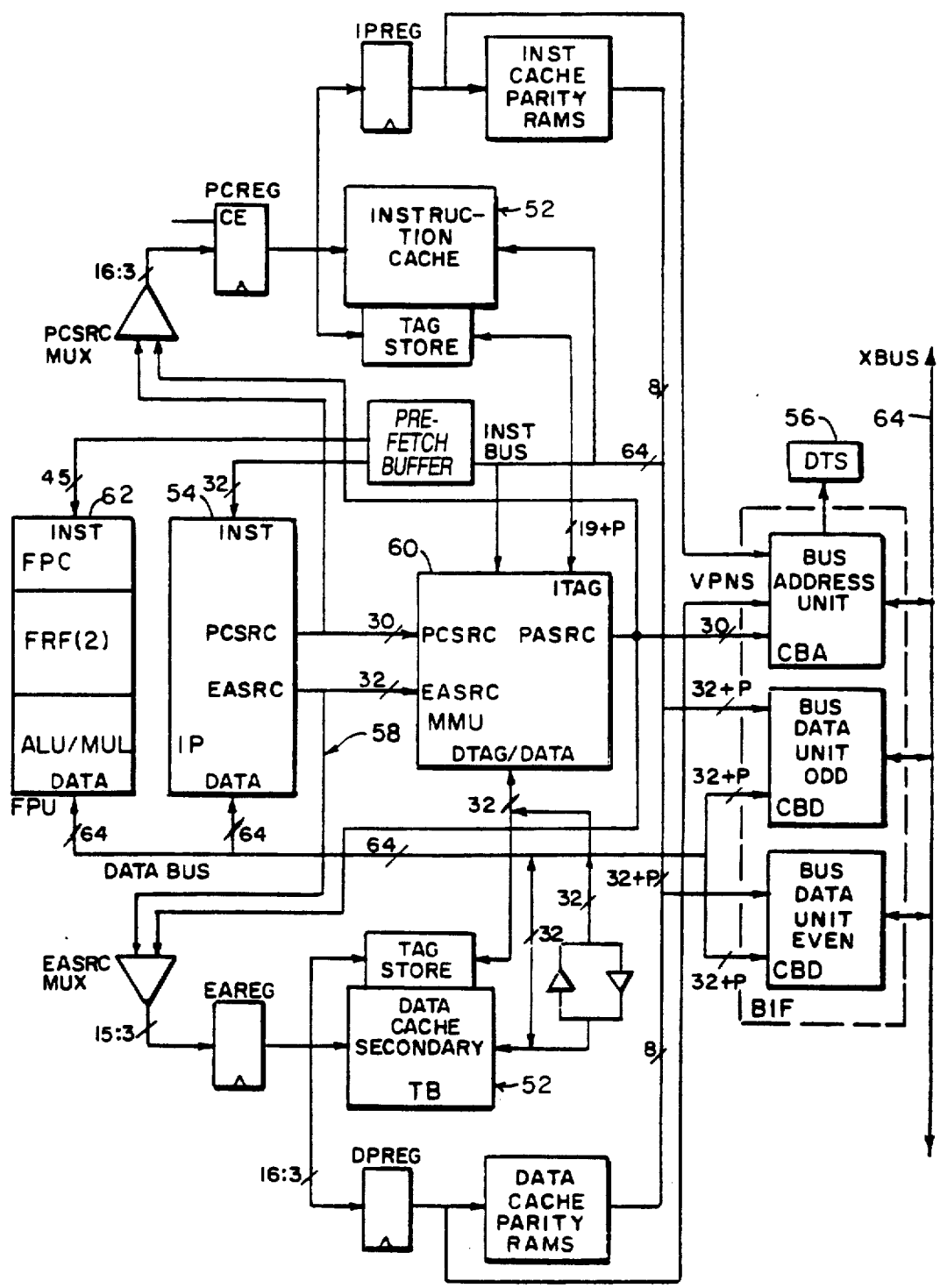
FIG. 1 is a block diagram of a pipeline processor of incorporating one embodiment of the present invention.

Referring to the process shown in the block diagram 50 of FIG. 1 for a read operation, the first cycle of cache access, herein called the ACCess (ACC) stage, involves transferring the requested cache data from the cache data store 52 to the processor 54. Additionally, the tag is transferred from the cache tag store 56 to the cache management function, in the Memory Management Unit (MMU) 60, which begins the cache tag comparison while other logic within the cache management function checks for non-cache related exceptions. Further details regarding exceptions are provided in DUPLICATE TAG STORE PURGE QUEUE, Application Ser. No. 07/263,711, now abandoned, and in METHOD AND APPARATUS FOR DRAM MEMORY PERFORMANCE ENHANCEMENT Application Ser. No. 07/264,270, now U.S. Pat. No. 5,022,004, both filed concurrently herewith and incorporated by reference. By the end of the ACC stage, the data has been clocked into the processor 54 and cache tag compare is completed.

Figure 2:
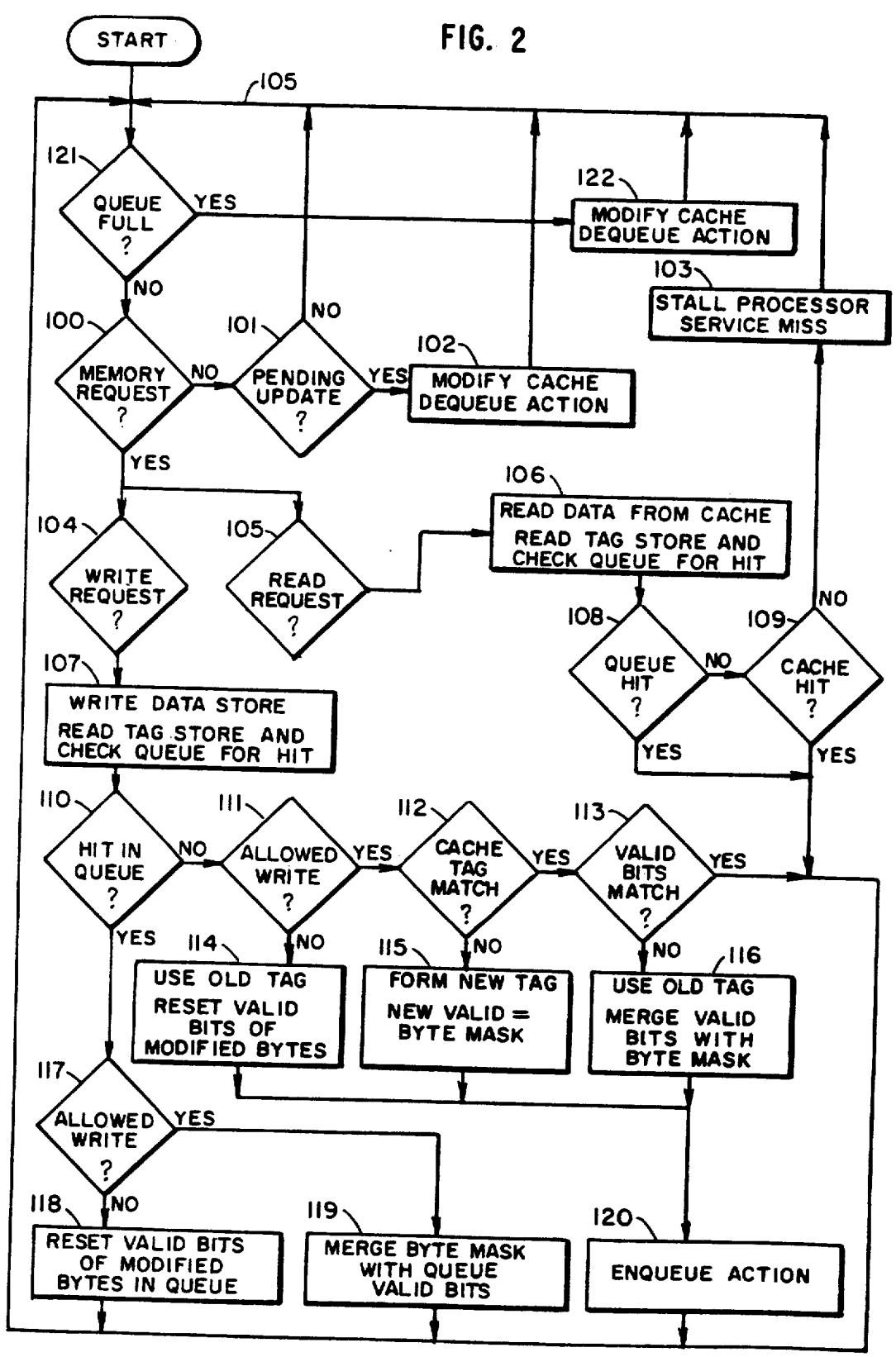
FIG. 2 is a flow diagram showing the operation according to one embodiment of the present invention.
Figure 3:
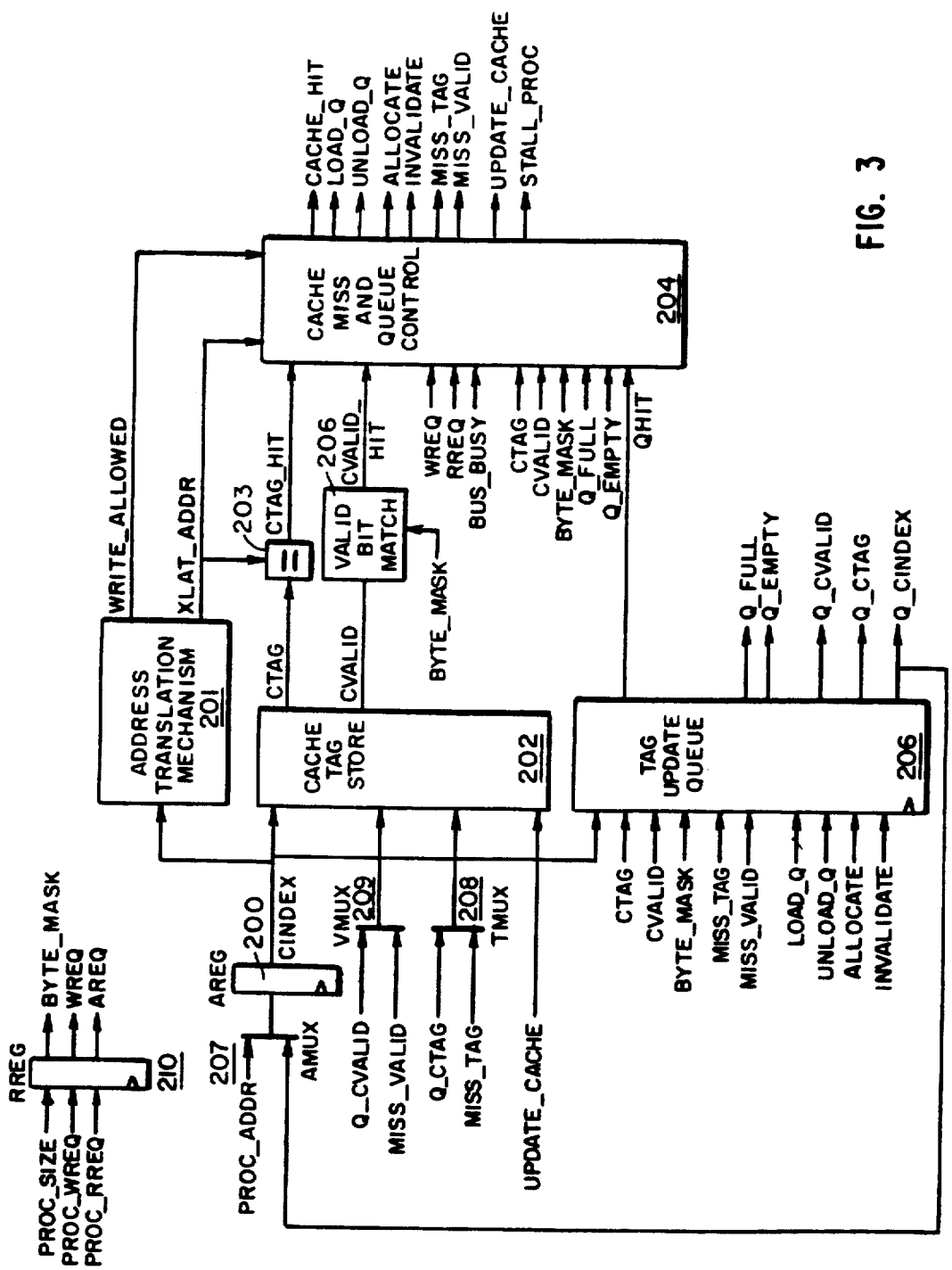
FIG. 3 is a more detailed block diagram showing specific functional elements operative according to the flow chart of FIG. 2 in the implementation of FIG. 1.

The present invention is described with respect to FIGS. 2 and 3, wherein:

The method and apparatus of the present invention approaches the optimal solution which includes a means that neither destroys cache contents nor stalls the processor while the normal cache access is underway, achieving a single-cycle cache store access without a significant loss in system performance through deferred tag modification. Single-cycle cache store access is achieved by allowing the processor to modify cache data while the tag lookup is being performed. If a cache hit occurs, the processor proceeds uninterrupted. If a cache miss occurs, the tag must be modified to reflect the new contents of that cache entry, since the cache was modified before the status of the cache access was known. Tag modification must either result in the invalidation or the allocation of the modified cache entry. To increase cache performance, cache allocation should be adopted since it is always better to allocate data in a cache rather than purge some.

Typically, programs do not reference data in memory every cycle. This observation implies that there will always be unused cache bandwidth. It is the intention of this invention, through buffering, to defer tag modifications that result from cache write misses, to these "free" cache cycles so that processor stalls may be avoided. Tag modification deferment does imply that the cache is temporarily inconsistent. Subsequent cache accesses, to entries which have pending tag modifications, must validate their accesses against any pending tag updates scheduled in the tag modification buffer as well as the cache itself. Once the buffer is emptied, cache consistency is restored.

The number of deferred tag modifications is application dependent; this invention implies no conceptual limit. During short periods of time, programs tend to reference data that is physically close to one another. Given this, it is possible that successive deferred tag modifications may actually affect the same cache entry. If so, the tag modification operations may be "merged", thereby reducing the number of "free" cache cycles needed to update the cache and increasing the effectiveness of the tag modification buffer.

The primary concepts of this invention allowing single-cycle cache access are: to read/write the data cache data store now and to update the tag store later, if necessary; to defer tag modifications that result from write misses; to idle cache cycles to minimize the probability of processor stalls; to merge cache tag state, deferred tag state, and current reference state to achieve maximum performance.

Although the cache access flow represented in the flow chart of FIG. 3 serializes many tests and activities, actual implementations of this invention will adopt some degree of paralellism to maximize performance. A block diagram of a preferred implementation is shown in FIG. 3. At cycle, t, a processor presents the memory request address to the cache management function (CMF) on the PROC_ADDR bus which will then be loaded into the "address register" (AREG), 200, FIG. 3, via the "address mux" (AMUX), 207. The request size and type are loaded into the request register, 210.

At cycle, t+1, the memory request address is presented to the "cache tag store" (CTS), 202, the "address translation mechanism" (ATM), 201, and the "tag update queue" (TUQ), 206 via the CINDEX bus. The ATM provides the physical address translation on the XLAT_ADDR bus for those systems which use this invention in conjunction with physical caches. In addition, the ATM provides status which is later used to determine write access privilege. This is the first stage of the cache access pipeline. For write requests the data cache data store is written, unconditionally. The entire cycle is used to check cache and queue hit/miss status.

At cycle, t+2, the second cycle of cache access, the result of the cache and queue lookup are known and the necessary status is reported back to the processor. When a write miss occurred, the TUQ is updated as specified below while the processor proceeds, unaware of the miss condition. When a read miss occurs, the processor is stalled until the CMF retrieves the data from memory.

When a memory request is made, 100, FIG. 2, the CMF determine the type of request from the signals, WREQ and RREQ. In the case of a write request, the cache data store is written unconditionally, 104. The addressed cache tag is compared against the XLAT_ADDR via the "cache tag comparator" (CTC), 203 while byte validity is determined by a matching of cache tag valid bits and the memory reference's BYTE_MASK. Simultaneously, the TUQ, 206 is queried to determine if the addressed cache entry is scheduled for any subsequent tag modifications, 107.

A "queue write hit" is said to occur when the cache index matches the queued cache index and the XLAT_ADDR matches the queued cache tag, 110. The "cache miss and queue control" (CMQC), 204 then determines whether to allocate or invalidate those bytes accessed by this reference. In either case, only the valid bits of the matching queue entry are modified by the TUQ. The pertinent valid bit and control information is presented to the TUQ by the CMCQ over the MISS_VALID bus, ALLOCATE, INVALIDATE, and LOAD_Q signals.

A "queue write miss" is said to occur when the cache index does not match any queued cache index or the cache index match exists but the XLAT_ADDR does not match that entry's queued cache tag, 110. The CMQC must then "allocate" a new entry in the TUQ. The CMQC is responsible for presenting the proper tag and valid bit information, over the MISS_TAG and MISS_VALID buses, respectively, to the TUQ. Any valid bit manipulation is done by the CMQC. The allocation/invalidation decision is determined by the state of the WRITE_ALLOWED signal. If asserted, 117, the TUQ is instructed, by the CMQC, to merge the BYTE_MASK with the current contents to the queued cache valid bits when the ALLOCATE and LOAD_Q signals are asserted and there is a queue write hit, 119.

There are several reasons for disallowing cache writes: non-resident data, insufficient access privileges, unaligned memory reference, unencacheable data, etc. The CMF block diagram shows the ATM to be the sole determinant for allowing writes, FIG. 3. In general, this need not be the case. In any event, since the cache data store is written before write permission is known, the cache must be invalidated for those cases where writes are not allowed, to avoid cache inconsistencies. The CMQC instructs the TUQ to reset the queued valid bits, FIG. 2, 118 corresponding to those bits that are asserted in the BYTE_MASK by asserting the LOAD_Q and INVALIDATE signals. Merging tag update operations reduce the number of "free" cache cycles needed to update the cache and increase the effectiveness of the TUQ.

When a queue write hit does not occur, 110, then the result of the cache tag/valid bit compare may become important. However, if the write request were not "allowed", a cache invalidation must be scheduled, 111. The CMQC passes the previous contents of the cache tag over the MISS_TAG bus. The CMQC forms the MISS_VALID bits by resetting the piped cache valid bits corresponding to those bits that were asserted in the BYTE_MASK. This operation effectively "invalidates" those bytes accessed by the illegal cache reference. The TUQ is then instructed to load the queue with this information. Since a queue write hit did not occur a new queue entry is created when the CMQC asserts the LOAD_Q and INVALIDATE signals, 114, 120.

When a queue hit does not occur and the cache write is allowed and the cache tag matches the XLAT_ADDR, then that cache entry is totally unrelated to this cache reference, 112 and a cache allocation is scheduled by creating a new entry in the A TUQ. The MISS_TAG becomes the piped XLAT_DDR and MISS_VALID becomes the pipe BYTE_MASK bits, 115, 120. The TUQ creates this new entry when the LOAD_Q and ALLOCATE signals are asserted.

When a queue hit does not occur and the cache write is allowed and the cache tag matches the XLAT_ADDR and the valid bits do not match, 113, a cache allocation is scheduled by creating a new entry in the TUQ which effectively updates the "missing" valid bits. The MISS_TAG becomes the piped copy of the XLAT_ADDR and MISS_VALID is the logical OR of the piped BYTE_MASK bits and the piped cache valid bits, 116, 120. The TUQ creates this new entry when the LOAD_Q and ALLOCATE signals are asserted. When a queue hit does not occur and the cache write is allowed and the cache tag matches the XLAT_ADDR and the valid bits match, 113, a cache hit is said to occur. No tag modifications are scheduled.

Had the originally issued memory reference been a read request, 105, the request address would have been presented to the CMF in the same manner as described above for the write requests. For read requests, the data is read from the data store while the queue and tag store lookups are made, 106. It should be noted that all queued tag state supercedes any cache tag state when a cache entry has a related valid queue entry in the TUQ (i.e., queued cache index matches cache index of current memory request). A "queue read hit" is said to occur when the cache index matches the queued cache index, the XLAT_ADDR matches the queued cache tag, and the BYTE_MASK is inclusive of the queued valid bits. Should a read request result in a queue read hit, then the data read from the cache is valid and the processor can proceed, 108.

When a read request cannot be satisfied by the TUQ, then the result of the cache tag/valid bit comparison becomes important. If the cache tag matches the XLAT_ADDR and the BYTE_MASK is inclusive of the cache tag valid bits, then a "read hit" is said to occur and the processor can proceed, 109. Otherwise, a "read miss" occurs and the processor must stall until the requested data can be fetched from memory, 103. The steps taken beyond this point are beyond the scope of this invention.

The CMQC will attempt to only dequeue tag modifications when the cache is not busy, i.e., no memory requests posted, 100 and the queue is not empty, 101. When this condition exists the CMQC takes control of the cache. The cache tag store is addressed by the queued cache index, Q_CINDEX, via the AREG, 200 via the AMUX, 207. The cache tag is updated with the queued cache tag, Q_CTAG, and the queued valid bits, Q_VALID, TMUX, 200, and VMUX, 208 multiplexors, respectively. The queue unload sequence may proceed as long as there are no memory requests pending. For finite length queues, a long stream of write misses can "fill" the queue before the CMF has a chance to unload anything. In this case, the CMF will stall the processor and preempt any use of the cache so that an adequate portion of the TUQ can be unloaded, 121.

APPENDIX I

For a read operation, the second cycle of cache access, herein called the EXCeption (EXC) stage, involves signalling all cache and non-cache related exception status to the processor 54. This latent notification implies the processor must adopt the instruction continue model for trapping data references if the data received in the ACC stage has modified processor state. In the case where the tag matches and the tag valid bit is set (i.e., "cache hit"), the processor proceeds unaware of the EXC stage of cache access, hence the "illusion" of single cycle cache access. Back-to-back cache access is achieved by overlapping the EXC stage of memory reference i with the ACC stage of memory reference i+1. If the tag mismatches or the tag valid bit is not set, a "cache miss" sequence is triggered. At this time, the cache management function takes control of the cache while the processor waits for the return of the "valid" data to the processor.

The actual cache read/write takes place during the ACC phase of a data cache access. According to this present invention, a partial tag comparison is also made in this cycle in the MMU. The DTLB is accessed in the ACC cycle and the proper bit set, containing the VA translation (PPN), is selected for comparison with the data cache physical tag. The ACC stage reflects the state of the operand reference currently in progress.

The ACC stage state is composed of the current operand address (CURRENT_EA), current operand size (CURRENT_SIZE), and the current cache operation type (CURRENT_OP) and any pending EASRC bus request. The source of this information is the EASRC bus, IP_SIZE, and IP_CACHEP_OP, and IP_EREQ respectively. From this information, the MMU can determine the validity of the cache access (i.e. data cache or TB miss, access violation, etc.) in the subsequent cycle. In some cases (e.g. access violations, unaligned address error, translation cache or DTLB miss, force cache miss), faults are detected before the end of the ACC stage, but, signalling is delayed until the EXC stage to maintain a consistent model for trap reporting.

Since the MMU is the default master, the MMU will regain control of the EASRC bus in this stage if there are not any pending IP or bus interface EASRC bus requests. If the CURRENT_OP is a STORE the MMU will recirculate the write miss virtual address and prepare the cache tag to be updated. If the CURRENT_OP is a LOAD, the Secondary TB miss address is recirculated and the cache is prepared for a TB lookup. These actions are done so that, probabilistically, the MMU could shave a cycle out of write miss or DTLB miss by assuming one of these two conditions will occur. If a write miss is not detected, the MMU will simply rewrite the tag. If a DTLB miss does not happen, the MMU will ignore the secondary TB tag it fetched.

Any stalls or exceptions resulting from the DTLB lookup or the data cache tag comparison are signaled in the second phase of cache access called, the EXCEPTION (EXC) stage. The EXC stage contains the state of a potentially faulting data cache reference.

The EXC stage state is composed of the missed operand address (MISS_EA), the missed operand size (MISS_SIZE), and the missed cache operation type (MISS_OP). This pipeline stage is fed directly from the previous pipeline stage, the ACC stage. Additionally, the result of the access check is saved in a register (DCHECK), which includes the CURRENT_EA/MISS_EA comparison result (write, miss merge) and the physical address of the operand accessed is saved in the DPA (data physical address) register. This stage contains all the necessary information to complete a cache access check, to issue a request to the physical memory/I/O subsystem, if needed, to aid in stall recovery, and to signal any detected exceptions in the IP.

If the virtual address translation is in the DTLB (DTLB Hit), no access violations are detected, the operand is in the data cache (Dcache Hit), and there are not any higher priority requestor for the EASRC bus, the IP and MMU pipeline progress, undisturbed. The operand transfer is considered valid. Normal Pipeline operation is shown below.

TABLE 1

| Cycle | Activity |
|---|---|
| 1 | IP fetches instruction i [LOAD]. |
| 2 | IP requests use of EASRC Bus [asserts IP_EREQ] for instruction i. IP fetches instruction i+1 [STORE]. |
| 3 | MMU gives bus to IP [negates MMU_EASRC_BUSY] for instruction i. IP presents data cache request [EASRC, IP_CACHE_OP, IP_SIZE] for instruction i. IP requests use of EASRC Bus [asserts IP_EREQ] for instruction i+1. MMU loads data cache request info for inst. i info into ACC stage at end of this cycle. |
| 4 | IP recites operand [from DATA bus] for instruction i from data cache. MMU [ACC stage] begin checking instruction i access for validity. MMU gives bus to IP [negates MMU_EASRC_BUSY] for instruction i+1. IP presents data cache request [EASRC, IP_CACHE_OP, IP_SIZE] for instruction i+1. |
| 5 | MMU [EXC stage] signals access for instruction i is valid [asserts MMU_EVALID]. IP transmits operand [on DATA bus] for instruction i+1 for write into data cache. MMU [ACC stage] begins checking instruction i+1 access for validity. MMU [EXC stage] signals access for instruction i+1 is valid |

TABLE 1-continued

| Cycle | Activity |
|---|---|
| | [asserts MMU_EVALID]. |

The following are kinds of cause of stalls and exceptions that can be detected by the EXC stage.

If a write miss is detected or an invalidate is posted, the MMU will have asserted MMU_EASRC_BUSY in the EXC (invalidate actually can happen in any cycle) stage. This type of stall has the effect of stalling any instruction in its EA stage, while any other instruction in its DC or WL stage progress. At the time the write miss was detected (WL of i), a LOAD(i+1) or STORE(i+1) could be in its DC phase. It is useful to save the status of that cache access, rather than rerun that reference, after the write miss service, to regain the access state of i+1. This state makes up the WMM stage.

A read miss occurs whenever the data cache tag does not match the virtual address translation or when the tag matches but the proper byte valid bits are not set properly. For example if the IP reads byte O of a cache line and all the valid bits for that line, except for byte O, are set, a miss occurs even if the data cache tag matches the virtual address translation.

When one of the above conditions exists, the MMU stalls the requesting processor and its the data cache pipeline, by asserting MMU_EASRC_BUSY and negating MMU_EVALID. The MMU then gains control of the EASRC, DATA, DTAG busses in preparation for the subsequent cache allocation. The BIF supplies the virtual address of the miss operand by placing it on the physical address bus, enabling the PASRC-to-EASRC bus transceivers and also supplies the necessary cache control for the actual cache allocation. A read request for two quadwords is made to the BIF if the missed reference was an integer LOAD. The MMU supplies the physical address of the missed reference with the read request. Eight quadwords are fetched if the missed reference was a floating point LOAD on a 64-byte boundary. When the data becomes available to the MMU, the BUS IC notifies the MMU by placing the code for READ_MISS_DATA_AVAIL on the MEM_RESP control lines and places the requested data on the DATA bus. The MMY will also recirculate EASRC(2:0) and IP_SIZE(1:0) of the missed reference, during the allocation process. The new data and tag (supplied by the MMU) are written into the cache while the BIF increments the refill address on EASRC by 8. In the next cycle, the BIF writes the second quadword and associated tag into the data cache. As soon as the data requested by the IP/FP comes across the DATA bus, MMU_EVALID is asserted in the following cycle to indicate to the IP/FP that the requested data is available. When cache allocation is complete, the MMU conditionally restores the state of the EAREG by testing the CURRENT_OP field in the ACCESS_EA stage of the MMU pipeline. If a cache request was made in the cycle following the cache access that missed, CURRENT_EA, which contains the virtual address of the subsequent cache access, in the ACCESS_EA pipeline is placed on the EASRC bus to be loaded into the EAREG. Additionally, the MMU recirculates IP_CACHE_OP, IP_SIZE (for the external control PAL's benefit) of the reference, to restore the memory pipeline. The MMU then negates MMU_E-

VALID and the IP/FP pipelines continues with valid data.

The MMU and BIF always exchanges ownership of the EASRC bus when the MMU during the last line of the allocation. If an ECCC error occurs on the last line of the cache allocation, the MMU will give the EASRC bus back to the BIF. The BIF then recirculates the address of the last cache line. Once valid data becomes available, the BIF must hold the address, control, and data one additional cycle for the new valid data. If an ECCU or bus error is detected, the BIF again holds the address, control, and data for additional cycle and the MMU will invalidate the bad line in the second cycle the address is held.

What is claimed:

1. In a digital computer system cache memory, tag store memory and cache control means, a method of transferring data to said cache, comprising the steps of:
   transferring the data from an initial location to a destination location within the cache memory during a first cycle;
   transferring a tag associated with the data to a tag store management means during said first cycle for comparison with a stored tag, located in a tag store and associated with said destination location;
   transferring the tag associated with the data to a queue management means during said first cycle for comparison with a queue tag, located in a queue and associated with said destination location, wherein
      said step of transferring the data from said initial location to said destination location is coincident with a clock signal and wherein comparison of the tag associated with the data with said stored tag and the queue tag is completed by the end of said first cycle;
   signalling status of data stored in said initial location to said cache control means in a second cycle;
   initiating a tag update for creating a new tag during said second cycle by
      transferring the result of the comparison of the tag associated with the data with said stored tag and with said queue tag to said cache control means and further transferring status of data stored in said initial location to said cache control means during said second cycle;
      transferring said new tag to said queue during said second cycle; and
      transferring said new tag from said queue to said tag store during a later cycle.

2. The method of claim 1 wherein said step of initiating said tag update comprises the steps of:
   transferring said stored tag to said cache control means subsequent to comparison and upon the occurrence of the tag associated with the data being not equal to said queue tag;
   transferring said queue tag to said cache control means subsequent to comparison and upon the occurrence of the tag associated with the data being equal to said queue tag;
   resetting a portion of the tag transferred to said cache control means upon the improper status of data stored in said initial location; and
   merging a byte mask with a portion of the tag transferred to said cache control means upon proper status of data stored in said initial location.

3. The method of claim 1 wherein said step of transferring said new tag to said queue includes:
   merging said new tag with said queue tag associated with said destination location upon the occurrence of the tag associated with the data being equal to said queue tag.

4. Apparatus for selectively transferring data and corresponding tag to a cache memory, comprising:
   a processor providing data to said cache memory during a first cycle, said data including a corresponding tag;
   a tag store having tag store management means for receiving said corresponding tag from said processor and for performing a comparison during said first cycle between said corresponding tag and a store tag located in said tag store and associated with said cache memory;
   a queue having queue management means for receiving said corresponding tag from said processor and for performing a comparison during said first cycle between said corresponding tag and a queue tag located in said queue and associated with said cache memory;
   means for signalling to said cache memory in a second cycle a status of said processor;
   tag update means, receiving a result of the comparison between said corresponding tag and said store tag and receiving a result of the comparison between said corresponding tag and said queue tag and receiving said status of said processor, for creating a tag update and transferring said tag update to said queue during said second cycle; and
   cache tag management means, receiving said tag update from said queue, for transferring said tag update to said tag store during a later cycle.

5. The apparatus of claim 4 wherein said tag update means further comprises:
   means for transferring said store tag from said tag store to said tag update means upon said corresponding tag being not equal to said queue tag;
   means for transferring to said tag update means said queue tag from said queue upon said corresponding tag being equal to said queue tag;
   means for resetting a portion of the tag transferred upon improper status of said processor; and
   means for merging a byte mask with a portion of the tag transferred upon proper status of said processor.

6. The apparatus of claim 4 further comprising:
   means for signalling a status of said queue to said cache memory;
   means for inhibiting said processor according to an improper status of said queue.

7. The apparatus of claim 4 wherein said queue management means further includes:
   merge means receiving said tag update for merging said tag update with said queue tag associated with said destination location upon said corresponding tag being equal to said queue tag.

* * * * *